(12) United States Patent
Niedert et al.

(10) Patent No.: US 10,473,235 B2
(45) Date of Patent: Nov. 12, 2019

(54) BYPASS CHECK VALVE AND VENTURI HAVING SAME

(71) Applicant: DAYCO IP HOLDINGS, LLC, Troy, MI (US)

(72) Inventors: Andrew D. Niedert, New Hudson, MI (US); Brian M. Graichen, Leonard, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

(21) Appl. No.: 16/000,443

(22) Filed: Jun. 5, 2018

(65) Prior Publication Data

US 2018/0283578 A1 Oct. 4, 2018

Related U.S. Application Data

(63) Continuation of application No. 14/678,106, filed on Apr. 3, 2015, now Pat. No. 10,024,458.

(Continued)

(51) Int. Cl.
*F16K 47/04* (2006.01)
*F16K 15/02* (2006.01)
(Continued)

(52) U.S. Cl.
CPC ............. *F16K 47/04* (2013.01); *B60T 17/02* (2013.01); *B60T 17/04* (2013.01);
(Continued)

(58) Field of Classification Search
CPC ... F16K 15/02; F16K 47/04; F02M 35/10275; F02M 35/10118; F02M 35/10229;
(Continued)

(56) References Cited

U.S. PATENT DOCUMENTS 3,430,437 A 3/1969 Saussele et al.
3,581,850 A 6/1971 Jaitl
(Continued)

FOREIGN PATENT DOCUMENTS

CN 2400655 Y 10/2000
CN 2636018 Y 8/2004
(Continued)

OTHER PUBLICATIONS

PCT, International Search Report with Written Opinion; International Application No. PCT/US2014/059672 (dated Jan. 9, 2015).
(Continued)

*Primary Examiner* — P. Macade Nichols
(74) *Attorney, Agent, or Firm* — FisherBroyles, LLP; Susan M. Oiler

(57) ABSTRACT

Check valves are disclosed and include a housing defining an internal cavity having a first seat and a second seat, and a seal member within the internal cavity translatable between a closed position against the first seat and an open position against the second seat. The second seat has a middle axis transverse to a plane of a longitudinal cross-section of the housing and has a shortest finger positioned to either the left or to the right of the middle axis. The seal member is seatable against the second seat at an angle or in a deflected position against the plurality of fingers, thereby defining a longer distance of travel to reach the closed position for a portion of the check valve disc that is associated with the position of the shortest finger relative to other portions of the check valve disc.

23 Claims, 10 Drawing Sheets

Related U.S. Application Data

(60) Provisional application No. 61/975,542, filed on Apr. 4, 2014.

(51) Int. Cl.
  *F02M 35/10* (2006.01)
  *B60T 17/02* (2006.01)
  *B60T 17/04* (2006.01)
  *F02M 35/12* (2006.01)

(52) U.S. Cl.
  CPC ............... *F02M 35/10118* (2013.01); *F02M 35/10229* (2013.01); *F02M 35/10275* (2013.01); *F02M 35/1272* (2013.01); *F16K 15/02* (2013.01); *Y10T 137/7754* (2015.04); *Y10T 137/7839* (2015.04)

(58) Field of Classification Search
  CPC ......... Y10T 137/7754; Y10T 137/7839; B60T 17/02; B60T 17/04
  See application file for complete search history.

(56) References Cited

U.S. PATENT DOCUMENTS

| | | | |
|---|---|---|---|
| 3,826,281 | A | 7/1974 | Clark |
| 4,215,717 | A | 8/1980 | Trosch |
| 4,354,492 | A | 10/1982 | McPhee |
| 4,556,086 | A | 12/1985 | Raines |
| 4,683,916 | A | 8/1987 | Raines |
| 4,893,654 | A | 1/1990 | Feuz |
| 4,951,708 | A | 8/1990 | Miller |
| 4,958,661 | A | 9/1990 | Holtermann et al. |
| 5,108,266 | A | 4/1992 | Hewitt |
| 5,291,916 | A | 3/1994 | Kloosterman et al. |
| 5,783,780 | A | 7/1998 | Watanabe et al. |
| RE37,090 | E | 3/2001 | Kloosterman et al. |
| 6,308,731 | B1 | 10/2001 | Kawasaki |
| 7,029,103 | B2 | 4/2006 | Iida |
| 7,610,140 | B2 | 10/2009 | Hirooka |
| 7,628,170 | B2 | 12/2009 | Kok-Hiong et al. |
| 7,673,653 | B2 | 3/2010 | Mijers et al. |
| 8,162,006 | B2 | 4/2012 | Guala |
| 8,517,056 | B2 | 8/2013 | Cullin |
| 2005/0121084 | A1 | 6/2005 | Andersson |
| 2006/0016477 | A1 | 1/2006 | Zaparackas |
| 2006/0144453 | A1 | 7/2006 | Steele |
| 2007/0163664 | A1 | 7/2007 | Mijers et al. |
| 2008/0145238 | A1 | 6/2008 | Shibayama et al. |
| 2011/0132311 | A1 | 6/2011 | Pursifull et al. |
| 2011/0186151 | A1 | 8/2011 | Sparazynski |
| 2012/0024249 | A1 | 2/2012 | Fuhrmann et al. |
| 2013/0139911 | A1 | 6/2013 | Wilson et al. |
| 2013/0213510 | A1 | 8/2013 | Burnham et al. |
| 2014/0014080 | A1 | 1/2014 | Beshay et al. |
| 2014/0165962 | A1 | 6/2014 | Pursifull |
| 2015/0204452 | A1 | 7/2015 | Fletcher et al. |
| 2015/0285401 | A1 | 10/2015 | Niedert et al. |

FOREIGN PATENT DOCUMENTS

| | | |
|---|---|---|
| CN | 201377408 Y | 1/2010 |
| CN | 201907500 U | 7/2011 |
| EP | 0442582 A1 | 8/1991 |
| JP | H01-111878 U | 7/1989 |
| JP | 2009168134 | 7/2009 |
| WO | 92/21882 A1 | 12/1992 |
| WO | 2007/050011 A1 | 5/2007 |
| WO | 2008/014306 A2 | 1/2008 |

OTHER PUBLICATIONS

PCT, International Search Report with Written Opinion; International Application No. PCT/US2015/024195 (dated Jul. 24, 2015).
PCT, International Search Report with Written Opinion; International Application No. PCT/US2015/033079 (dated Aug. 21, 2015).
PCT, International Search Report with Written Opinion; International Application No. PCT/US2017/032837 (dated Aug. 10, 2017).
U.S. Non-Final Office Action; U.S. Appl. No. 14/509,612 (dated Dec. 18, 2015).
U.S. Final Office Action; U.S. Appl. No. 14/509,612 (dated Jun. 22, 2016).
U.S. Final Office Action; U.S. Appl. No. 14/600,598 (dated Aug. 19, 2016).
U.S. Advisory Action; U.S. Appl. No. 14/509,612 (dated Sep. 1, 2016).
U.S. Notice of Allowance; U.S. Appl. No. 14/509,612 (dated Oct. 17, 2016).
EP, Extended European Search Report; European Application No. 14852220.4 (dated May 10, 2017).
EP, Supplemental Search Report; European Application No. 15773286.8 (dated Jan. 16, 2018).
EP, First Office Action; European Application No. 1482220.4 (dated Mar. 21, 2018).
CN, Seach Report with English Translation; Chinese Application No. 201480001422.9 (dated Jul. 20, 2016).
CN, Office Action with English Translation; Chinese Application No. 2014800001422.9 (dated Aug. 1, 2016).
CN, Search Report with English Translation; Chinese Application No. 201580000496.5 (dated Dec. 14, 2016).
CN, Office Action; Chinese Application No. 201580000496.5 (dated Dec. 23, 2016).
CN, English Translation of Office Action; Chinese Application No. 201580000496.5 (dated Dec. 23, 2016).
CN, Office Action; Chinese Application No. 201580000496.5 (dated Aug. 15, 2017).
CN, English Translation of Office Action; Chinese Application No. 20158000496.5 (dated Sep. 14, 2017).
CN, Office Action with English Translation; Chinese Application No. 2014800001422.9 (dated Feb. 16, 2017).
EP, First Office Action; European Application No. 15773286.8 (dated Aug. 22, 2018).
JP, First Office Action with English Translation; Japanese Application No. 2016-521267 (dated Sep. 11, 2018).
JP, First Office Action with English Translation; Japanese Application No. 2016-559892 (dated Feb. 22, 2019).
EP, Second Office Action; European Application No. 15773386.8 (dated Jan. 30, 2019).

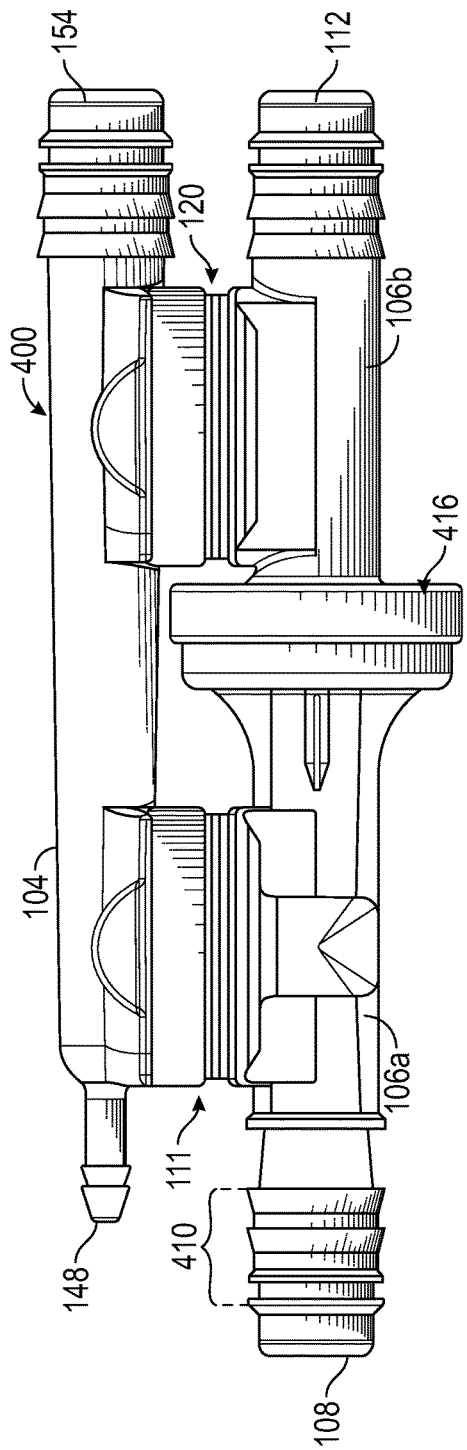
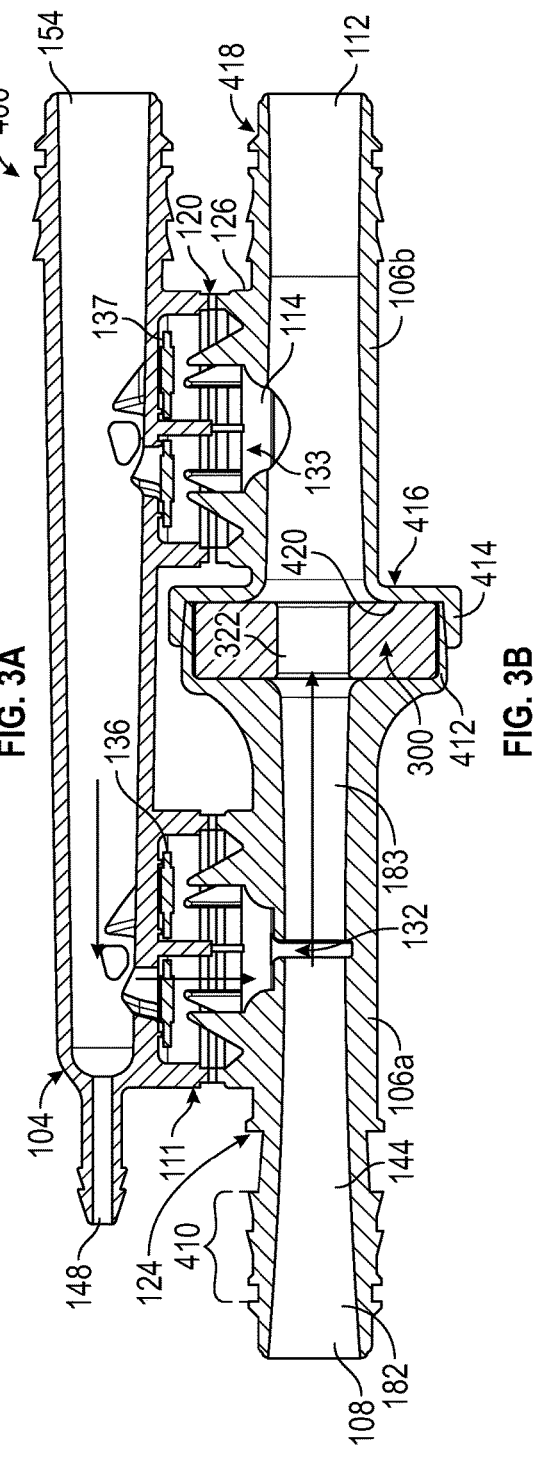
FIG. 3A
FIG. 3B

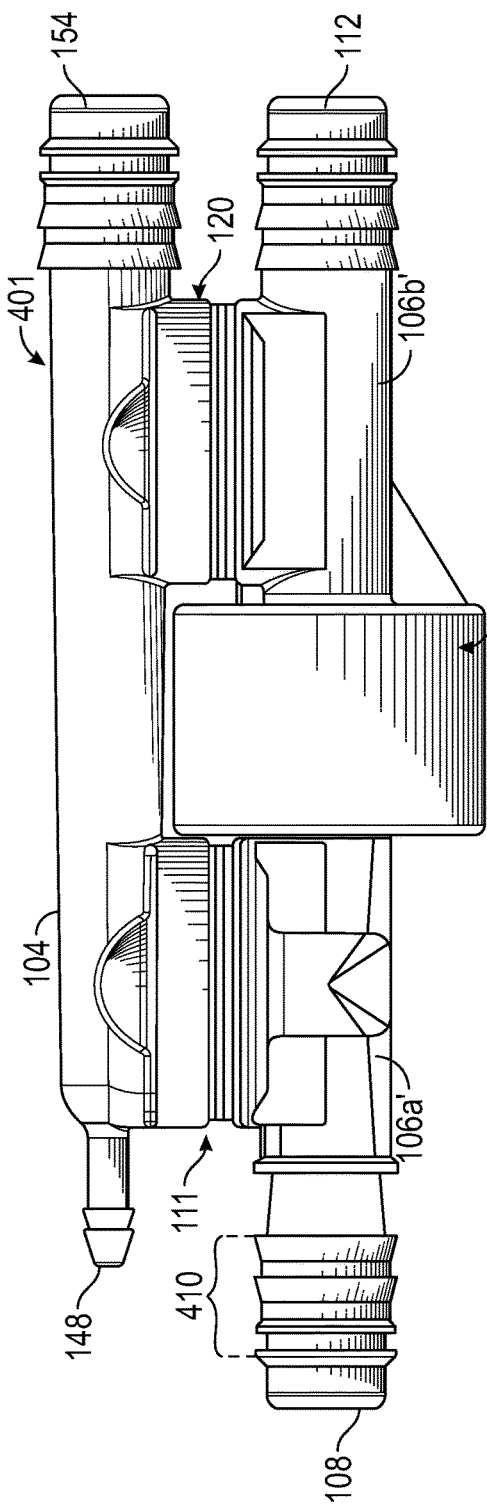

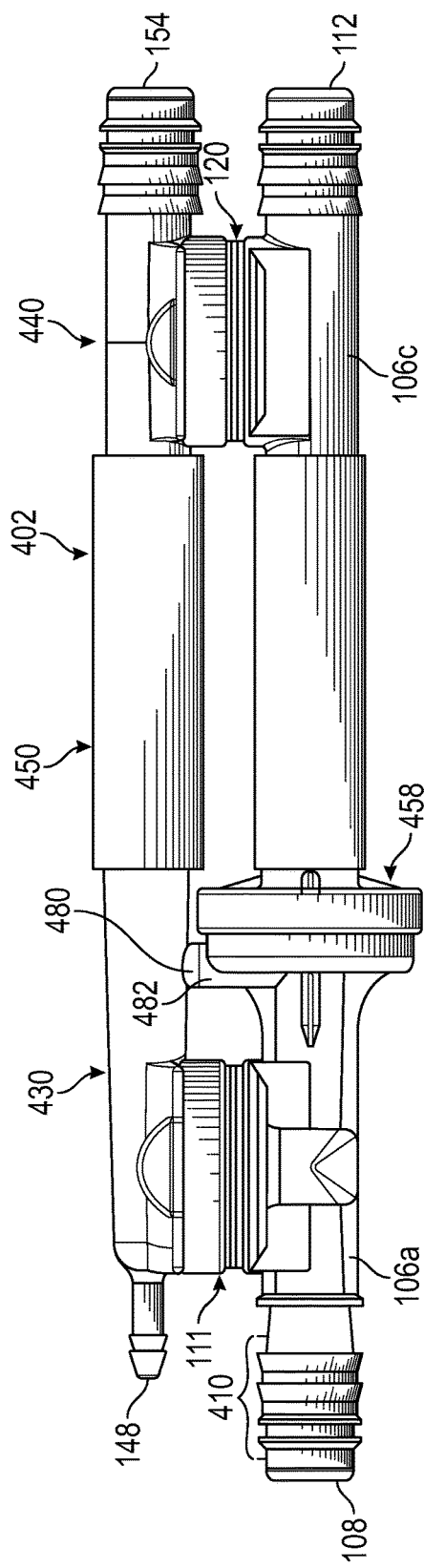
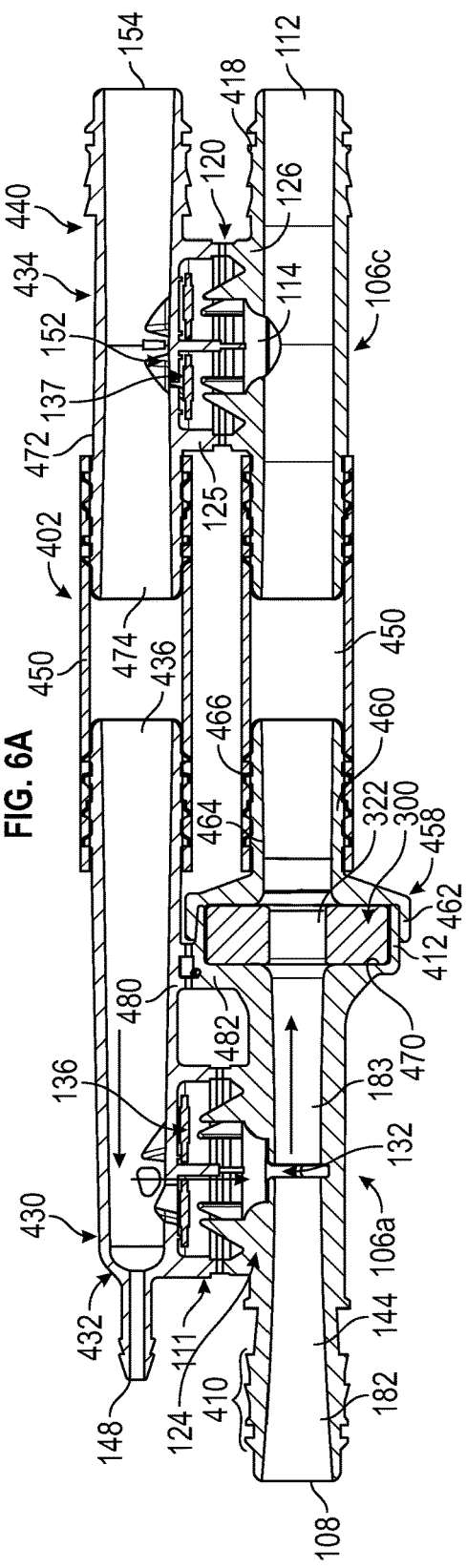
FIG. 6A
FIG. 6B

BYPASS CHECK VALVE AND VENTURI HAVING SAME

RELATED APPLICATIONS

This application is a continuation of U.S. application Ser. No. 14/678,106, filed Apr. 3, 2015, which claims the benefit of U.S. Provisional Application No. 61/975,542, filed Apr. 4, 2014, incorporated herein by reference in its entirety.

TECHNICAL FIELD

This application relates to noise attenuation in aspirators for producing vacuum using the Venturi effect and check valves, more particularly a bypass check valve therein having improved flow of air therethrough which seals more quickly.

BACKGROUND

Engines, for example vehicle engines, have included aspirators and/or check valves for a long time. Typically, the aspirators are used to generate a vacuum that is lower than engine manifold vacuum by inducing some of the engine air to travel through a Venturi gap. The aspirators may include check valves therein or the system may include separate check valves.

During most operating conditions of an aspirator or check valve the flow is classified as turbulent. This means that in addition to the bulk motion of the air there are eddies superimposed. These eddies are well known in the field of fluid mechanics. Depending on the operating conditions the number, physical size, and location of these eddies is continuously varying. One result of these eddies being present is that they generate pressure waves in the fluid. These pressure waves are generated over a range of frequencies and magnitudes. When these pressure waves travel through the connecting holes to the devices using this vacuum, different natural frequencies can become excited. These natural frequencies are oscillations of either the air or the surrounding structure. If these natural frequencies are in the audible range and of sufficient magnitude then the turbulence generated noise can become heard, either under the hood, and or in the passenger compartment. Such noise is undesirable and new aspirators and/or check valves are needed to eliminate or reduce the noise resulting from the turbulent air flow.

SUMMARY

The noise problems and the uneven closing of the seal member in the bypass check valve, described herein, have been overcome by the various embodiments disclosed herein. The bypass check valve has a housing defining an internal cavity having a first seat and a second seat, and a seal member within the internal cavity translatable between a closed position against the first seat and an open position against the second seat. The second seat defines a support structure having a middle region of a predetermine height and a downstream side having a height that is shorter than the predetermined height of the middle region. The seal member is seatable against the second seat with a downstream portion thereof a further distance from the first seat than an upstream portion thereof.

In one embodiment, the second seat further may also include an upstream side that has a height shorter than the height of the middle region, but greater than the height of the downstream side. In one embodiment, the seal member is deflectable between a generally planar closed position against the first seat and an arcuate position against the second seat. While in another embodiment, the seal member may be generally rigid is an is seated against the second seat at an angle relative to the surface defining the first seat of the bypass check valve.

The middle region has a height that positions the seal member closer to the first seat than a predetermined distance, and the support structure includes a plurality of fingers extending into the internal cavity circumferentially spaced apart about an outlet port of the check valve. The plurality of fingers have differing heights and the following arrangement: (i) at least two diametrically opposed fingers that define the middle region; (ii) one or more mid-height fingers on the upstream side of the middle region, which have a height that is about 10% to about 30% less than the total height of the fingers defining the middle region; and (iii) one or more shorter fingers on the downstream side of the middle region, which have a height that is less than the height of the mid-height fingers.

The support structure may also include one or more fourth-height fingers positioned relative to the one or more mid-height fingers to be proximate a side thereof that is opposite the middle region. These fourth-height fingers have a height that is less than the height of the mid-height fingers, but greater than the height of the one or more shorter fingers. Further, one or more fifth-height fingers may be included that are positioned relative to the shorter fingers to be proximate a side thereof that is opposite the middle region. These fifth-height fingers may have a height that is less than the shorter fingers.

In one embodiment, the housing may include a pin extending into the internal cavity, a bore through the seal member, and the pin received in the bore for translation of the seal member along the pin.

In another aspect, the bypass check valves described herein may be included in a Venturi device to control fluid flow through a bypass port disposed downstream of and bypassing a Venturi gap. The Venturi device may include a second check valve controlling fluid flow through a suction port in fluid communication with the Venturi gap, and a first sound attenuating member disposed in the fluid path between the Venturi gap and the second port of the bypass check valve, and/or a second sound attenuating member connected upstream of an inlet port into the bypass check valve. The first sound attenuating member may be housed in a dual chambered canister that forms a first chamber housing the sound attenuation member and a second chamber surrounding at least a portion of a discharge section leading away from the Venturi gap upstream from the first chamber, and the second sound attenuating member may be disposed within a conduit or housing placing the sound attenuating member within a fluid flow path in fluid communication with the bypass check valve, which may be a single chamber or a dual chamber similar to that of the first sound attenuating member.

BRIEF DESCRIPTION OF THE DRAWINGS

FIG. 3A is a side, perspective view of a second embodiment of an aspirator for attenuating noise from turbulent air flow.

FIG. 3B is a side, longitudinal cross-sectional plan view of the aspirator of FIG. 3A.

FIG. 5A is a side, perspective view of a third embodiment of an aspirator for attenuating noise from turbulent air flow.

FIG. 5B is a side, longitudinal cross-sectional plan view of the aspirator of FIG. 5A.

FIG. 6A is a side, perspective view of a fourth embodiment of an aspirator for attenuating noise from turbulent air flow.

FIG. 6B is a side, longitudinal cross-sectional plan view of the aspirator of FIG. 6A.

DETAILED DESCRIPTION

Figure 1:
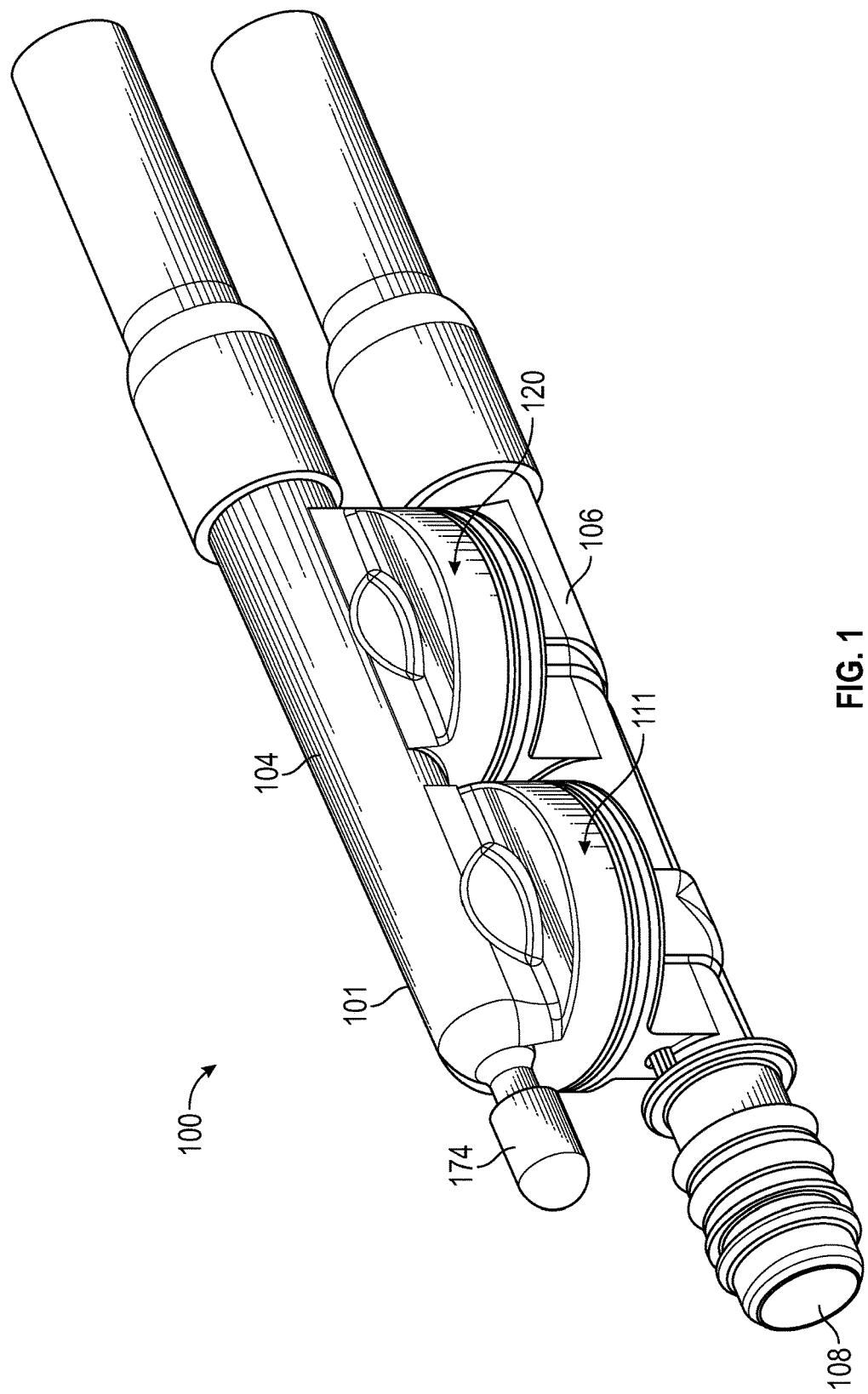
FIG. 1 is a side, perspective view of a first embodiment of an aspirator for attenuating noise from turbulent air flow.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

FIG. 1 is an external view of an aspirator-check valve assembly, generally identified by reference number 100, for use in an engine, for example, in a vehicle's engine. The engine may be an internal combustion, and the vehicle and or engine may include a device requiring a vacuum. Check valves and or aspirators are often connected to an internal combustion engine before the engine throttle and after the engine throttle. The engine and all its components and/or subsystems are not shown in the figures, with the exception of a few boxes included to represent specific components of the engine as identified herein, and it is understood that the engine components and/or subsystems may include any commonly found in vehicle engines. While the embodiments in the figures are referred to as aspirators herein because the motive port 108 is connected to atmospheric pressure, the embodiments are not limited thereto. In other embodiments the motive port 108 may be connected to boosted pressure, such as the pressures attributed to boosted air produced by a turbocharger and as such the "aspirator-check valve assembly" is now preferably referred to as an ejector, or generically both may be referred to as Venturi devices.

Figure 2:
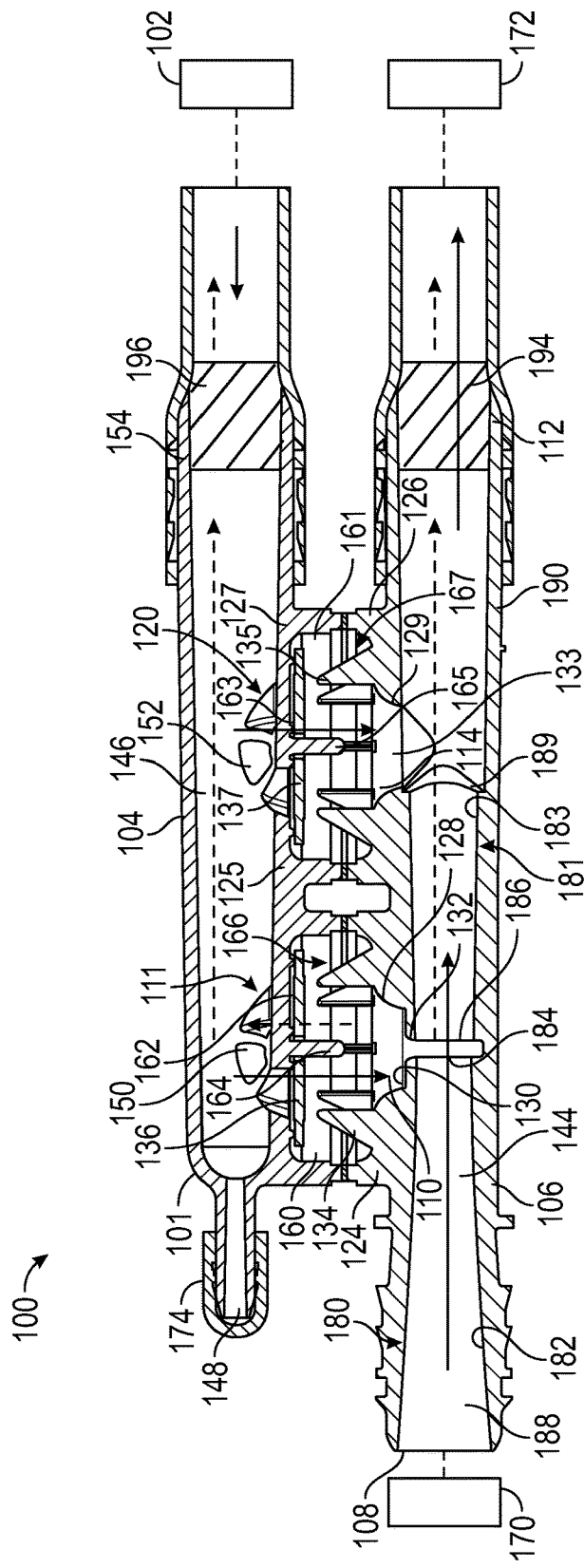
FIG. 2 is a side, longitudinal cross-sectional plan view of the aspirator of FIG. 1.

The aspirator-check valve assemblies disclosed herein may have alternate embodiments such as the embodiment of FIGS. 1 and 2, FIGS. 3A and 3B, FIGS. 5A and 5B, FIGS. 6A and 6B, and FIG. 7. Each aspirator-check valve assembly, as represented in FIG. 2, is connectable to a device requiring a vacuum 102 and creates vacuum for said device 102 by the flow of air through a passageway 144, extending generally the length of a portion of the aspirator-check valve assembly, designed to create the Venturi effect. The aspirator-check valve assemblies include housing 101, which as illustrated is formed of an upper housing portion 104 and a lower housing portion 106. The designations of upper and lower portions are relative to the drawings as oriented on the page, for descriptive purposes, and are not limited to the illustrated orientation when utilized in an engine system. Preferably, upper housing portion 104 is joined to lower housing portion 106 by sonic welding, heating, or other conventional methods for forming an airtight seal therebetween.

Still referring to FIGS. 1-2, the lower housing portion 106 defines passageway 144 which includes a plurality of ports, some of which are connectable to components or subsystems of the engine. The ports include: (1) a motive port 108, which supplies clean air from the engine intake air cleaner 170, typically obtained upstream of the throttle of the engine, when used as an aspirator; (2) a suction port 110, which can connect via the check valve 111 to a device requiring vacuum 102; (3) a discharge port 112, which is connected to an engine intake manifold 172 downstream of the throttle of the engine; and, optionally, (4) a bypass port 114. Check valve 111 is preferably arranged to prevent fluid from flowing from the suction port 110 to the application device 102. In one embodiment, the device requiring vacuum 102 is a vehicle brake boost device, but is not limited thereto. The bypass port 114 may be connected to the device requiring vacuum 102 and, optionally, may include a check valve 120 in the fluid flow path therebetween. Check valve 120 is preferably arranged to prevent fluid from flowing from the bypass port 114 to the application device 102.

As shown in FIG. 2, lower housing portions 106 in both embodiments includes lower valve seats 124, 126. Each lower valve seat 124, 126 is defined by a continuous outer wall 128, 129, and, optionally, a bottom wall such as wall 130 in lower valve seat 124. A bore 132, 133 is defined in each lower valve seat 124, 126 to allow for air flow communication with air passageway 144. In FIG. 2, each lower valve seat 124, 126 includes a plurality of radially spaced fingers 134, 135 extending upwardly from an upper surface thereof. The radially spaced fingers 134, 135 serve to support a seal member 136, 137.

Referring again to FIGS. 1-2, the upper housing portion 104 is configured for mating to or with the lower housing portion 106 to form the check valves 111, 120, if both are present. Upper housing portion 104 defines passageway 146 extending the length thereof and defines a plurality of ports, some of which are connectable to components or subsystems of the engine. The ports include: (1) a first port 148 that may be capped with cap 174 or may be connected to a component or subsystem of the engine; (2) a second port 150 in fluid communication with the suction port 110 in the lower housing portion 106, and between which the seal member 136 is disposed; (3) a third port 152 in fluid communication with the bypass port 114 in the lower housing portion 106, and between which the seal member 137 is disposed; and (4) a fourth port 154 which may function as an inlet connecting the aspirator-check valve assembly to a device requiring vacuum 102.

As shown in FIG. 2, the upper housing portion 104 in both embodiments includes upper valve seats 125, 127. Each upper valve seat 125, 127 is defined by continuous outer wall 160, 161 and bottom wall 162, 163. Both upper valve seats 125, 127 may include a pin 164, 165 extending downwardly from the bottom walls 162, 163, respectively, toward the lower housing portion 106. The pins 164, 165 function as a guide for translation of the seal members 136, 137 within the cavities 166, 167 defined by the mated upper valve seat 125 with the lower valve seat 124 and defined by the mated upper valve seat 127 with the lower valve seat 126. Accordingly, each seal member 136, 137 includes a bore therethrough sized and positioned therein for receipt of the pin 164, 165 within its respective cavity 166, 167.

Referring again to FIG. 2, the passageway 144 in the lower housing portion 106 has an inner diameter along a central longitudinal axis B (labeled in FIG. 7) that includes a first tapering portion 182 (also referred to herein as the motive cone) in the motive section 180 of the lower housing portion 106 coupled to a second tapering portion 183 (also referred to herein as the discharge cone) in the discharge section 181 of the lower housing portion 106. Here, the first tapering portion 182 and the second tapering portion 183 are aligned end to end (outlet end 184 of the motive section 180 to inlet end 186 of the discharge section 181). The inlet ends 188, 186 and the outlet end 184, 189 may be any circular shape, ellipse shape, or some other polygonal form and the gradually, continuously tapering inner diameter extending therefrom may define, but is not limited to, a hyperboloid or a cone. Some example configurations for the outlet end 184 of the motive section 180 and inlet end 186 of the discharge section 181 are presented in FIGS. 4-6 of co-pending U.S. patent application Ser. No. 14/294,7276, filed Jun. 3, 2014, incorporated by reference herein in its entirety.

As seen in FIG. 2, the first tapering portion 182 terminates at a fluid junction with suction port 110, which is in fluid communication therewith, and at this junction the second tapering portion 183 begins and extends away from the first tapering portion 182. The second tapering portion 183 is also in fluid communication with the suction port 110. The second tapering portion 183 then forms a junction with the bypass port 114 proximate the outlet end 189 of the second tapering portion and is in fluid communication therewith. The first and second tapering portions 182, 183 typically share the central longitudinal axis B of the lower housing portion 106.

Still referring to FIG. 2, the inner dimension of the second tapering portion 183 tapers gradually, continuously from a smaller inlet end 186 to a larger outlet end 189. This inner dimension may be any circular shape, ellipse shape, or some other polygonal form, including but not limited to a hyperboloid or a cone. The optional bypass port 114 may intersect the discharge section 190 as described above to be in fluid communication with the second tapering section 183. The bypass port 114 may intersect the second tapering section 183 adjacent to, but downstream of the outlet end 189. The lower housing portion 106 may thereafter, i.e., downstream of this intersection of the bypass port, continue with a cylindrically uniform inner diameter until it terminates at the discharge port 112. Each of the respective ports 108, 110, 112, and 114 may include a connector feature on the outer surface thereof for connecting the passageway 144 to hoses or other features in the engine.

When the aspirator-check valve assembly 100 is connected into an engine system, for example as illustrated in FIG. 2, the check valves 111 and 120 functions as follows. As the engine operates, the intake manifold 172 draws air into the motive port 180, through passageway 144 and out the discharge port 112. This creates a partial vacuum in the check valves 111, 120 and passageway 146 to draw seal members 136, 137 downward against the plurality of fingers 134, 135. Due to the spacing of fingers 134, 135 free fluid flow from passageway 144 to passageway 146 is allowed. The partial vacuum created by the operation of the engine serves in the vacuum assistance of at least the operation of the device requiring vacuum 102.

The fluid flow within the aspirator-check valve assemblies described above is generally classified as turbulent. This means that in addition to the bulk motion of the fluid flow, such as air, there are pressure waves traveling through the assembly and different natural frequencies can become excited thereby resulting in turbulence generated noise. The aspirator-check valve assembly 100 as seen in FIG. 2 include one or more sound attenuating members, 194, 196. The sound attenuating members 194, 196 are placed within the flow path proximate, but downstream of the regions where turbulence generated noise is created. As seen in FIG. 2 the first sound attenuating member 194 is disposed proximate to or in the discharge port 112 because the discharge section 190 is one portion where such noise is created. Also in FIG. 2, the second sound attenuating member 196 is present and is disposed proximate to or in the fourth port 154 of passageway 146 because the flow path between the bypass port 114, check valve 120, and the fourth port 154 is one portion where such noise is created.

The sound attenuating members 194, 196 are porous such that fluid flow through and between the passageways 144, 146 is not restricted, but sound (turbulence generated noise) is attenuated. With reference to FIG. 2, the solid arrows represent the fluid flow within the aspirator-check valve assembly and the dashed arrows represent the path for travel of the turbulence generated noise. As depicted, there are two potential paths for the turbulence generated noise: (1) toward the engine intake manifold 172; and (2) toward, and the device requiring vacuum 102. To eliminate or reduce this noise the porous elements are proximate but downstream of the source of the turbulent noise. For example, the sound attenuating members may be positioned in the discharge port, the suction port, the bypass check valve passageway above the check valve, and or the suction check valve passageway above the check valve.

The check valves 111, 120 can also produce turbulent noise due to the flow therethrough. This noise would travel down either of the two connections. Sound attenuating members may be placed in either the inlet or outlet passageways thereof.

The sound attenuating members 194, 196 are porous as explained above and can be made from a variety of materials including metals, plastics, ceramics, or glass. The sound attenuating members may be made from wire, woven or matted, sintered particles, fibers woven or matted, but are not limited thereto. The porous character of the sound attenuating members causes the noise pressure waves to attenuate by interfering with themselves but should be of sufficient size and shape to not unduly restrict fluid flow. In one embodiment, the sound attenuating members 194, 196 are not harmed (do not deteriorate) by operating temperatures of an engine based on placement of the aspirator in the engine system. Additionally, the sound attenuating members 194, 196 are not harmed by the vibrations experienced during operating conditions of the engine.

The embodiments depicted in FIGS. 3A and 3B, 5A and 5B, and 6A and 6B are alternate embodiments of aspirators 400, 401, and 402, respectively. Reference numbers identifying similar or the same components as described for FIGS. 1-2 are used in these figures as well. Each of these aspirators 400, 401, 402 include a porous sound attenuating member 300 within passage way 144 downstream of the bore 132 of a Venturi portion and disposed in the discharge section 181. So, as seen in FIGS. 3B, 5B, and 6B, the sound attenuating member 300 is after the bore 132 and before the bypass port 114. The sound attenuating member is shown to be the sound attenuating member of FIG. 4A, but of course is not limited thereto.

Figure 4C:
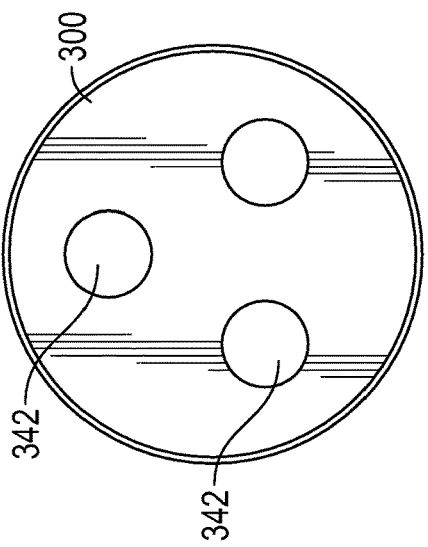
FIG. 4C is a top plan view of another embodiment of a sound attenuating member.
Figure 4B:
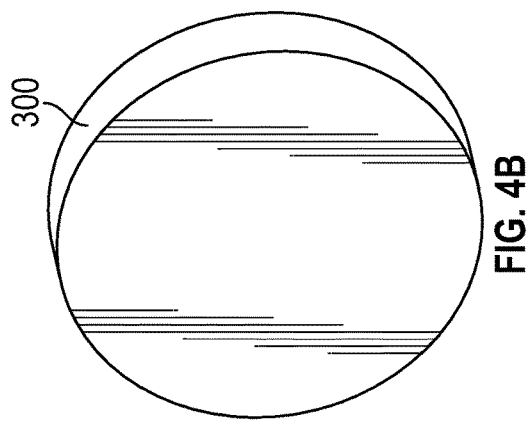
FIG. 4B is a top, perspective view of another embodiment of a sound attenuating member.
Figure 4A:
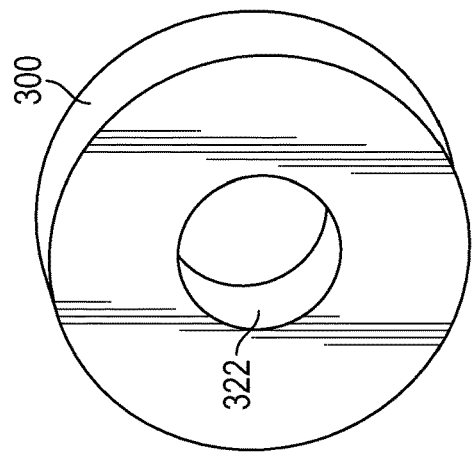
FIG. 4A is a top, perspective view of one embodiment of a sound attenuating member.

As seen in FIGS. 4A and 4C, the porous sound attenuating members, generally represented by reference number 300 in these figures, may include one or more bore holes 322, 342 therethrough. The bore holes provide the benefit of minimizing unwanted bulk flow restriction within any of the embodiments described herein. The bore holes 322, 342 may be circular in cross-section, but are not limited thereto. In another embodiment, the bore holes 322, 342 may be elliptical or polygonal in cross-section. Each bore hole has a generally central axis therethrough that is typically oriented generally parallel to the direction of the flow through the portion of the aspirator where the sound attenuating member 300 is disposed. As seen in FIG. 4A, if a single bore hole 322 is present it may be generally centrally positioned within the sound attenuating member 300, but is not limited thereto. The dimensions of the bore hole 322 are typically smaller than the internal dimensions of the upstream passageway adjacent to the sound attenuating member 300. When the bore hole 322 is circular in cross-section, the diameter of the bore hole 322 may be about 8 mm to about 14 mm. As seen in FIG. 4C, a plurality of bore holes 342 are present and are symmetrically positioned relative to one another within the porous sound attenuating member 300. These bore holes 342 may be circular in cross-section as shown but are not limited thereto and may also be non-symmetrically arranged is desired. As described for FIG. 4A, here also the dimensions of the bore holes 342 are smaller than the internal dimensions of the upstream passageway adjacent to the sound attenuating member 300. When bore holes 342 are circular in cross-section, the diameter of each may be about 3 mm to about 5 mm.

However, in an alternate embodiment, as seen in FIG. 4B, any of the porous sound attenuating members in the embodiments described herein may be a continuous plug of porous material with the only passageways therethrough being channels defined by its natural porosity, i.e., no enlarged bore holes are present. The continuous plug may be any shape and configuration to fit within the selected portion of the check valve or aspirator, but as illustrated may be disc-shaped.

The embodiment of FIGS. 3A and 3B has three primary housing pieces: (1) the upper housing portion 104 as described above and the lower housing portion 106 described above but split into a (2) Venturi portion 106a and (3) a bypass portion 106b. The Venturi portion 106a includes a motive port 108 that may include a hose connector 410 on the outer exterior surface defining the motive port 108, a motive cone 182, a suction Venturi 132, the lower half of the check valve 111, specifically the lower valve seat 124, and a discharge cone 183 terminating in a first canister portion 412. The bypass portion 106b includes a second canister portion 414 mateable with the first canister portion 412 to enclose the sound attenuating member 300 in an enclosed chamber 420 defined by canister 416 formed when the first and second canister portions 412, 414 are mated together. The bypass portion also include a bypass port 114 and the lower half of the check valve 120, specifically the lower seat 126, and discharge port 112 that may include a hose connector 418 on the outer exterior surface defining the discharge part 112.

When the upper housing portion 104 and the Venturi portion 106a and the bypass portion 106b are assembled, a first seal member 136 is seated in check valve 111 and a second seal member 137 is seated in check valve 120.

The embodiment of FIGS. 5A and 5B similar to the embodiment of FIGS. 3A and 3B has three primary housing pieces: (1) the upper housing portion 104, and the lower housing portion 106 described above, but split into a (2) Venturi portion 106a' and (3) a bypass portion 106b'. The Venturi portion 106a' is the same as disclosed in FIG. 5B except that upstream of where the discharge cone 183 terminates in a first canister portion 412 a collar 424 extends radially outward from the exterior surface of the discharge cone 183. As seen in FIG. 5B the collar 424 is positioned between the bore 132 and the first canister portion 412. The bypass portion 106b' is the same as disclosed in FIG. 3B except that the second canister portion 414' is configured to extend beyond the first canister portion 412 to mate to or be coupled to the collar 424. When the first canister portion 412 and the second canister portion 414' are mated together they enclose a sound attenuating member 300 therebetween in an enclosed chamber 420' and also form a second chamber 426 located between the collar 424 and the first canister portion 412. When assembled, the canister 417 is dual chambered having the second chamber 426 surrounding the outside of the discharge cone 183 upstream from the first chamber 420 housing the sound attenuating member 300. FIG. 3B, the second chamber 426 contains air and may be sealed to contain the air or may be in fluid communication with ambient air surrounding the aspirator 401. In another embodiment (not shown), the second chamber 426 may include a second sound attenuating member, which may be a porous material that does or does not include bore holes such as those shown in FIGS. 4A and 4C. When assembled, the aspirator 401 also includes, a first seal member 136 seated in check valve 111 between the upper housing portion 104 and the Venturi portion 106a' and a second seal member 137 seated in check valve 120 between the upper housing portion 104 and the bypass portion 106b'.

The embodiment of FIGS. 6A and 6B is essentially the embodiment of FIGS. 3A and 3B, but divided into two subassemblies 430, 440, one of which includes a sound attenuating canister 458, joinable into fluid communication by one or more hoses 450. The embodiment of FIGS. 5A and 5B could also be divided into two subassemblies as well in a similar fashion even though not illustrated in the figures. The subassemblies include a Venturi subassembly 430 and a bypass subassembly 440.

The Venturi subassembly 430 includes a first upper housing portion 432 that includes the upper valve seat 125 as described above and a lower Venturi portion 106a as described in FIG. 3B, which terminates with a first canister portion 412. When the first upper housing portion 432 is mated to the lower Venturi portion 106a, a first seal member 136 is seated between the upper valve seat 125 and the lower valve seat 126 to form check valve 111. The Venturi portion 106a includes a motive port 108 that may include a hose connector 410 on the outer exterior surface defining the motive port 108, a motive cone 182, a suction Venturi 132, the lower half of the check valve 111, specifically the lower valve seat 124, and a discharge cone 183 terminating in a first canister portion 412. Connectable to the lower Venturi portion 106a is a canister cap 460 comprising a second canister portion 462 and a connector portion 464 having hose connecting features 466 on its exterior surface. The second canister portion 462 is mateable with the first canister portion 412 to enclose the sound attenuating member 300 in an enclosed chamber 470 formed therebetween when the first and second canister portions 412, 414 are mated together.

As illustrated in FIGS. 6A and 6B, the first upper housing 430 may include a first stabilizing member 480 facing the lower Venturi portion 106a and positioned to mate with a second stabilizing member 482 included as part of the lower Venturi portion 106a. The assembled aspirator 402 has the first stabilizing member 480 mated with the second stabilizing member 482 to stiffen and strengthen the aspirator, in particular the half of the aspirator having the sound attenuating canister 458.

The bypass subassembly 440 includes a second upper housing portion 434 and a lower bypass portion 106c. The second upper housing portion 434 includes an upper valve seat 125 defining, as described above, a portion of check valve 120 and the third port 152, which is in fluid communication with the bypass port 114 in the lower bypass housing portion 106c. The second upper housing portion 434 also includes a conduit 472 having a fifth port 474 connectable to a sixth port 436 of the first upper housing portion 432 by a hose 450. The upper bypass housing portion 434 also includes the fourth port 154, described above, which may function as an inlet connecting the aspirator-check valve assembly 402 to a device requiring vacuum. The lower bypass housing portion 106c includes the bypass port 114, the lower half of the check valve 120, specifically the lower valve seat 126, and the discharge port 112 that may include a hose connecting features 418 on its outer exterior surface.

Through numerous tests of the various embodiments disclosed above, it was noticed that the seal member 137 in the bypass check valve 120 would move to the closed position in a generally uneven manner. In particular, a first portion of the seal member 137 most proximate to the discharge port 112 would move to the closed position first, and then, a second portion opposite thereof would move to the closed position. This problem is solved by bypass check valve 501 in the embodiment disclosed in FIG. 7 through a change in the configuration of the second seat 514, best seen in FIGS. 8A and 8B, by providing the second portion of the seal member 137, which would otherwise lag behind in the prior embodiments, a shorter distance to travel to reach the closed position, i.e., when the pressure in cavity 154 is less than the pressure at the discharge port 112. Accordingly, the bypass check valve is less likely to have the seal member stuck with the first portion of the seal member seated against the first seat in a closed position while the second portion is not seated thereagainst, i.e., not sealed in the closed position. The bypass check valve 501 in FIG. 7 operates such that the first and second portions of the seal member 510 are seated against first seat (the closed position shown in FIG. 7) closer in time to one another, and, ideally, generally simultaneously. An addition benefit of the bypass check valve 501 is that in the open position, with the second seal member 510 seated against the second seat 514, there is improved fluid flow past the seal member.

Figure 7:
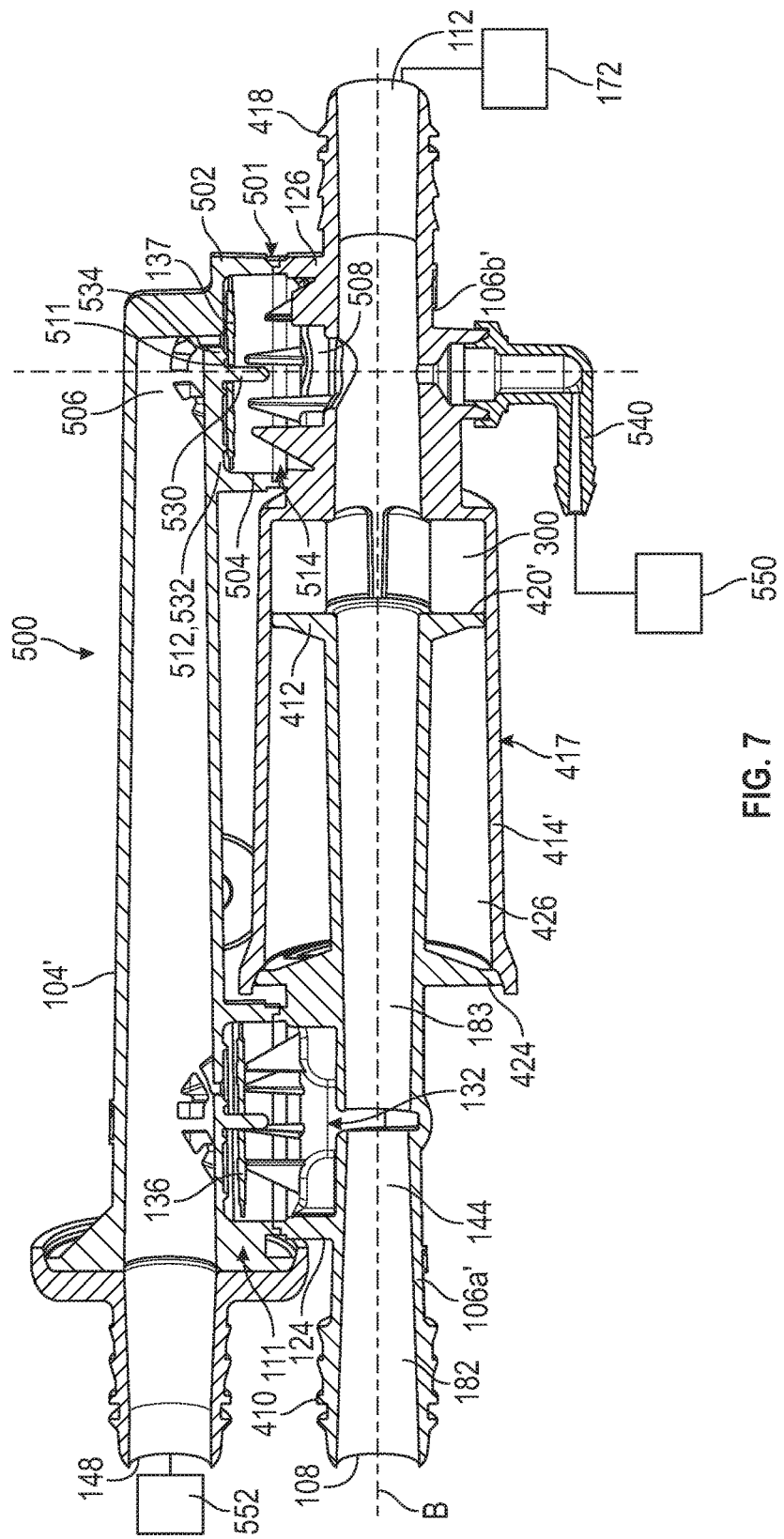
FIG. 7 is a side, longitudinal cross-sectional plan view of a fifth embodiment of an aspirator for attenuating noise from turbulent flow that includes an improved bypass check valve.

The embodiment of FIG. 7 is similar to the embodiment of FIGS. 5A and 5B in that the aspirator 500 has three primary housing pieces: (1) the upper housing portion, designated as 104' in this embodiment, and the lower housing portion 106 described above, but split into a (2) Venturi portion 106a' and (3) a bypass portion 106b'. The Venturi portion 106a' is generally the same as disclosed in FIG. 5B, i.e., upstream of where the discharge cone 183 terminates in a first canister portion 412 that includes a collar 424 extending radially outward from an exterior surface of the discharge cone 183. The collar 424 is positioned between the bore 132 and the first canister portion 412.

Still referring to FIG. 7, the bypass portion 106b' is similar to that disclosed in FIGS. 5A and 5B in that the second canister portion 414' is configured to extend beyond the first canister portion 412 to mate to or be coupled to the collar 424, but differs in that rather than having a fourth port as part of the upper housing portion 104' it is positioned below the bypass port 508 as auxiliary port 540. When the first canister portion 412 of the Venturi portion 106a' and the second canister portion 414' of the bypass portion 106b' are mated together they enclose a sound attenuating member 300 therebetween in an enclosed chamber 420' and also forms a second chamber 426 located between the collar 424 and the first canister portion 412. When assembled, the canister 417 is dual chambered having the second chamber 426 surrounding the outside of the discharge cone 183 upstream from the first chamber 420, which houses the sound attenuating member 300. The second chamber 426 may contain air and may be sealed to contain the air or may be in fluid communication with ambient air surrounding the aspirator 500. In another embodiment (not shown), the second chamber 426 may include a second sound attenuating member, which may be a porous material that does or does not include bore holes such as those shown in FIGS. 4A and 4C.

When assembled, as seen in FIG. 7, the aspirator 500 also includes, a first seal member 136 seated in check valve 111 between the upper housing portion 104' and the Venturi portion 106a' and a second check valve disc 510 seated in an improved bypass check valve 501 between the upper housing portion 104' and the bypass portion 106b'. The improved check valve 501 has a housing 502 (made up of a portion of the upper housing portion 104' and the lower bypass housing 106b') defining an internal cavity 504 having a first port 506 (inlet) and a second port 508 (outlet) both of which are in fluid communication with the internal cavity 504. The internal cavity 504 has a first seat 512 defining a closed position and a second seat 514 defining an open position. A seal member 137 is seated within the internal cavity 504 and is translatable between the closed position against the first seat 512 and the open position against the second seat 514. In one embodiment, the seal member 137 is generally made of a rigid material and as such is seated against the second seat in an angled position relative to the central longitudinal axis B. In another embodiment, the seal member may be flexible, flexible seal member 510 shown in FIG. 8B, which is deflectable between a flat sealing state (such as shown in FIG. 7) in the closed position and a deflected open state shown in FIG. 8B as an arcuate position against the second seat 514.

Figure 8A:
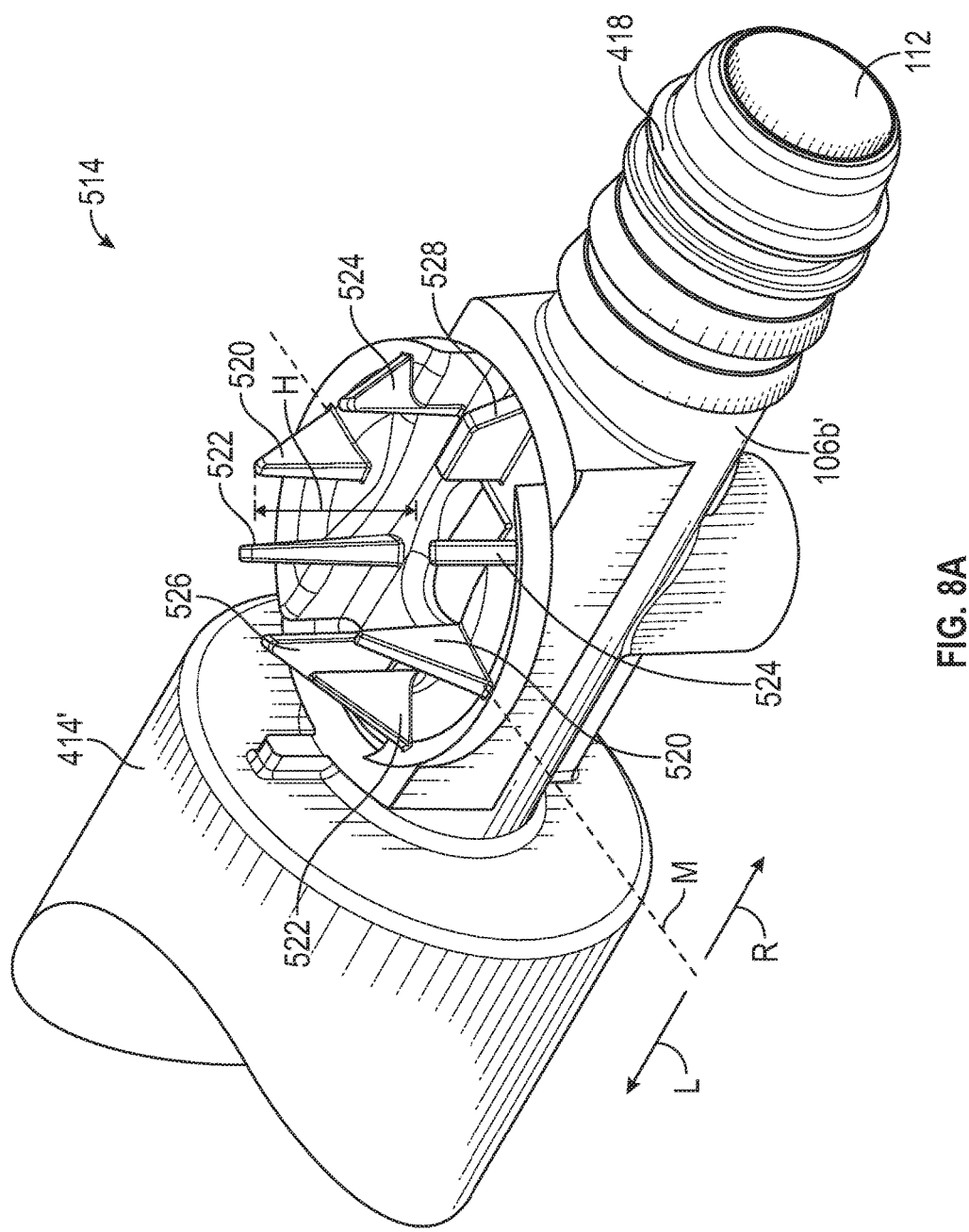
FIGS. 8A and 8B are end perspective and side plan views, respectively, of the lower valve seat portion of the bypass check valve shown in FIG. 7.
Figure 8B:
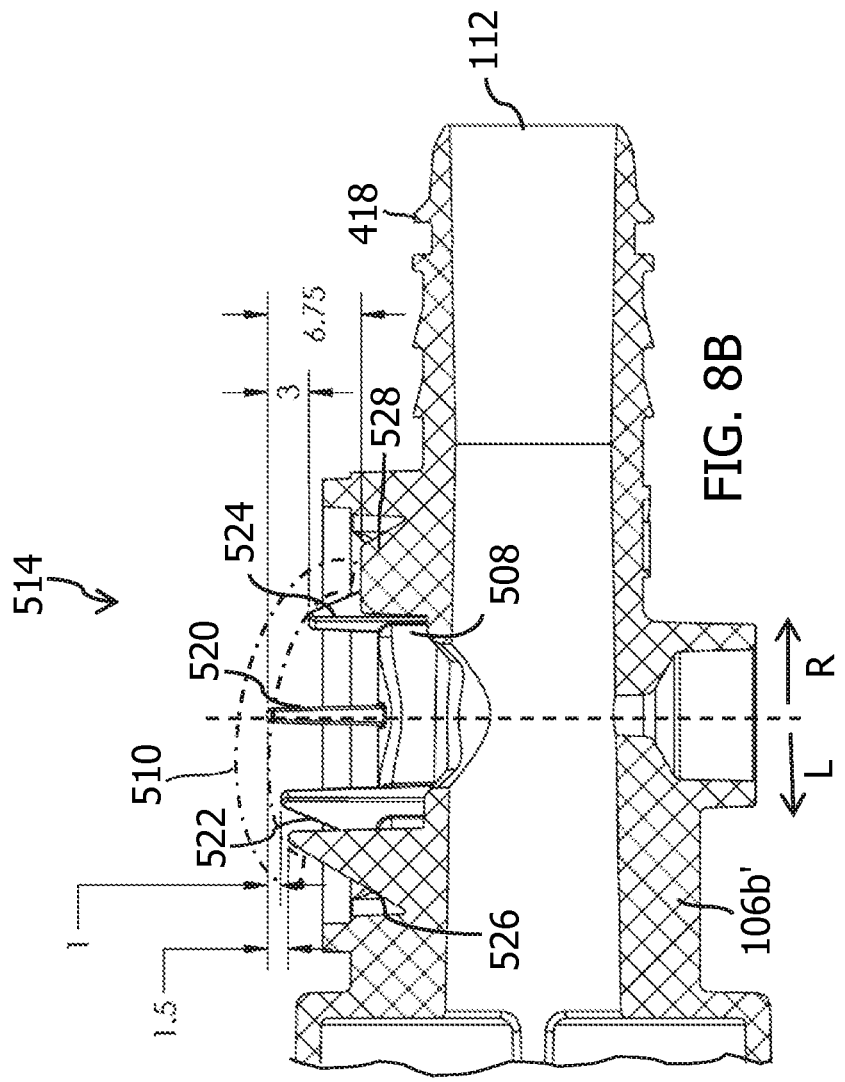

Now referring to FIGS. 8A and 8B, the second seat 514 defines a support structure for the seal member 510 that includes a right side R and a left side L that are both shorter than a middle region M, wherein the right side R is overall shorter than the left side L thereby allowing the seal member 510 to deflect more over the right side R than on the left side L. The middle region M has a height H (FIG. 8A) that positions the seal member 510 closer to the first seat 512 of FIG. 7 than a predetermined distance. The predetermined distance is selected for improved, quicker closing of the check valve and/or allowing a maximum amount of flow through the check valve, and may be about 0.5 mm to about 3 mm, or more preferably about 1 mm to about 2 mm. In one embodiment, the left side L is more proximate the motive port 108 and the right side R is more proximate the discharge port 112. The support structure includes a sufficient number of pathways for fluid to be in fluid communication with the second port 508 after passing through the first port 506 and over and around the seal member 510.

In one embodiment, the support structure of the second seat 514 may include a plurality of fingers 520, 522, 524, 526, 528 extending into the internal cavity 504 that are circumferentially spaced apart about the second port 508. The plurality of fingers may be equidistant apart from one another. The plurality of fingers have differing heights and include at least two diametrically opposed first fingers 520 that define the middle region M, one or more mid-height fingers 522, which are about 70% to about 90% of the total height of the first fingers 520 and define the left side L of the support structure, and one or more shorter fingers 524, which are shorter than the mid-height fingers 522 and define the right side R of the support structure. With this type of support structure for the second seat 514, the seal member 510 deflects sufficiently to permit high bypass flow of fluid from the device requiring vacuum 102 when the pressure in the device requiring vacuum 102 is greater than a manifold pressure of an engine that is fluidly coupled to the discharge port 112 of the aspirator 500 and also provides for quick, more uniform closure of the bypass check valve 501.

The support structure may also include one or more fourth-height fingers 526 that are shorter than the one or more mid-height fingers 522 and are positioned more proximate the motive port 108 than the one or more mid-height fingers 522. The support structure may also include one or more fifth-height fingers 528 that are shorter than the shorter fingers 524 and are positioned more proximate the discharge port 112 than the shorter fingers 524. FIG. 8B includes one example of heights for the plurality of fingers. In this figure, the first fingers 520 are the tallest, the mid-height fingers 522 are 1 mm shorter than the first fingers, the shorter fingers 524 are about 3 mm shorter than the first fingers (about 2 mm shorter than the mid-height fingers), the fourth-height fingers 526 are about 1.5 mm shorter than the first fingers (about 0.5 mm shorter than the mid-height fingers 522), and the fifth-height fingers 528 are about 6.75 mm shorter than the first fingers (about 3.75 mm shorter than the shorter fingers 524).

The seal member 510 may be or includes an elastomeric material suitable for use in the aspirator 500 when connected to the intake manifold 172 of an internal combustion engine, i.e., is durable when exposed to engine temperatures and pressures. In one embodiment, the seal member 510 may be or include one or more of a natural rubber, synthetic rubber, silicons, fluorosilicones, fluorocarbons, nitriles, EPDM, PTFE, and combinations thereof, but is not limited thereto.

As shown in FIG. 7, the housing 502 of the improved bypass check valve 501 includes a pin 530 extending into the internal cavity 504. The seal member 510 includes a bore 511 therethrough and the pin 530 is received therein. The seal member 510 is translatable along the pin. This is merely one non-limiting example of maintaining alignment of the seal member 510 during translation. The first seat 512 within the internal chamber 504 includes a first annular seal bead 532 and may include a second annular seal bead 534 disposed radially inward from the first annular seal bead 532.

Still referring to FIG. 7, as one example embodiment, the discharge port 112 is in fluid communication with an intake manifold of an internal combustion engine, the auxiliary port 540 is in fluid communication with a device 550 that utilizes vacuum, such as a brake system or a four wheel drive system, the motive port 108 is in fluid communication with a source of air, preferably clean air, and the first port 148 is in fluid communication with another device 552 utilizing vacuum such as a brake booster.

Figure 9:
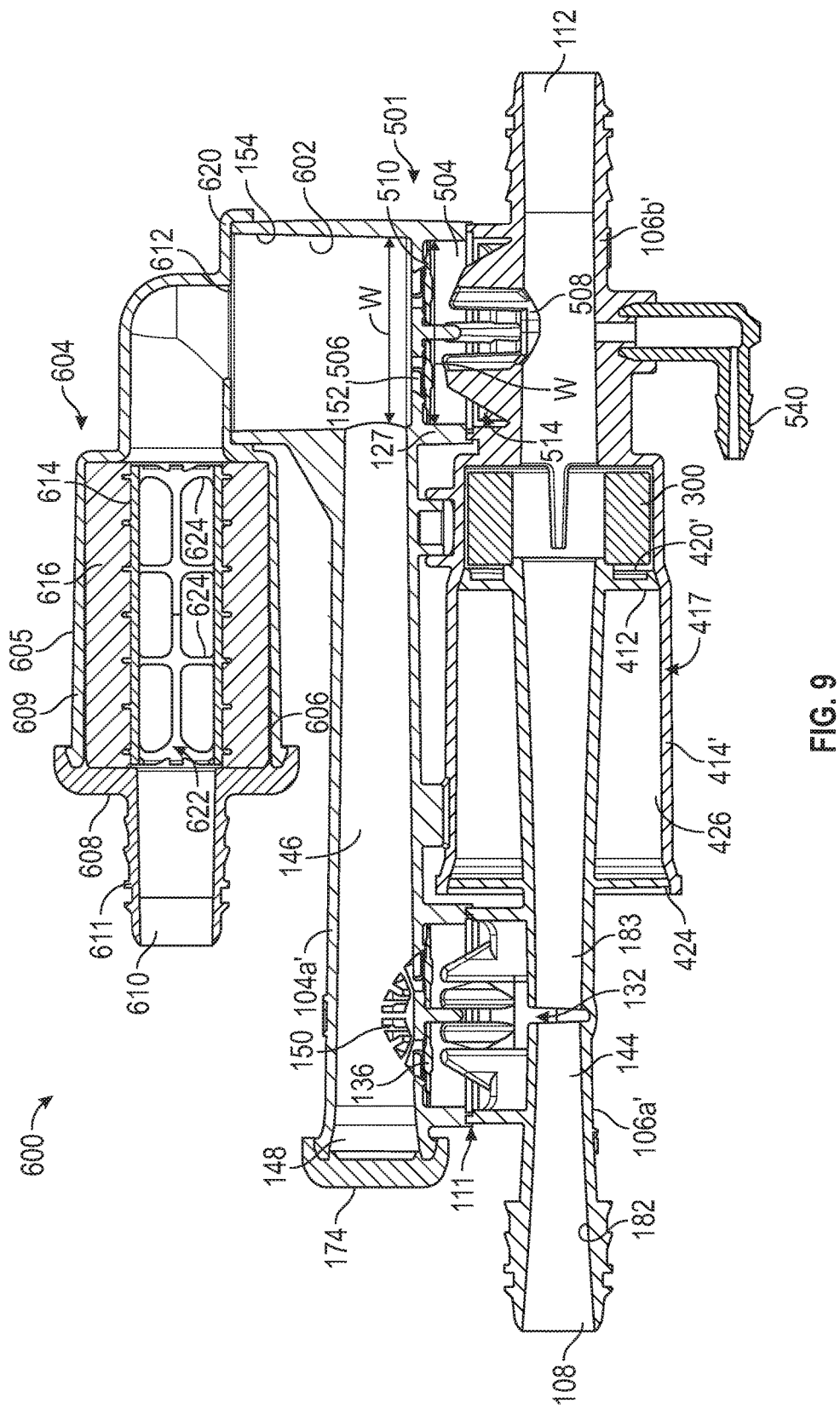
FIG. 9 is a side, longitudinal cross-sectional plan view of a sixth embodiment of an aspirator for attenuating noise from turbulent flow that includes an improved bypass check valve.

Referring now to FIG. 9, the embodiment of the aspirator-check valve assembly is generally designated as 600. This aspirator-check valve assembly 600 is generally similar to the embodiment of FIG. 7 and FIGS. 5A and 5B in that the aspirator 600 has three primary housing pieces: (1) the upper housing portion, designated as 104a' in this embodiment because it has a different configuration where it attaches to the bypass check valve 501; (2) a first portion defining part of the lower housing, referred to as the Venturi portion 106a'; and (3) a second portion defining the other part of the lower housing, referred to as a bypass portion 106b'. The Venturi portion 106a' is generally the same as disclosed in FIGS. 7 and 5B, i.e., upstream of where the discharge cone 183 terminates in a first canister portion 412 that includes a collar 424 extending radially outward from an exterior surface of the discharge cone 183. The collar 424 is positioned between the bore 132 and the first canister portion 412.

The bypass portion 106b' is similar to that disclosed in FIG. 7 in that it defines the second seat 514 having the improved support structure as set forth above, the second canister portion 414' configured to extend beyond the first canister portion 412 to mate to or be coupled to the collar 424 of the Venturi portion 106a', and an auxiliary port 540 in fluid communication with the discharge port 112 and the second port 508 of the bypass check valve 501. When the first canister portion 412 of the Venturi portion 106a' and the second canister portion 414' of the bypass portion 106b' are mated together they enclose a sound attenuating member 300 therebetween in an enclosed chamber 420' and also forms a second chamber 426 located between the collar 424 and the first canister portion 412. When assembled, the canister 417 is dual chambered having the second chamber 426 surrounding the outside of the discharge cone 183 upstream from the first chamber 420, which houses the sound attenuating member 300. The second chamber 426 may contain air and may be sealed to contain the air or may be in fluid communication with ambient air surrounding the aspirator 500. In another embodiment (not shown), the second chamber 426 may include a second sound attenuating member, which may be a porous material that does or does not include bore holes such as those shown in FIGS. 4A and 4C.

In this embodiment, the upper housing portion 104a' terminates above the upper valve seat 127 in a chamber 602, defined thereby, that is in fluid communication with: (1) the bypass check valve 501; (2) a noise attenuation unit 604 extending away from the chamber 602; and (3) the passageway 146 extending the length of the upper housing between the second check valve 111 and the bypass check valve 501. The chamber 602 has a width generally similar to the width of the bypass check valve 501, when taken relative to a longitudinal cross-section thereof as shown in FIG. 9, but the width may divergingly increase as the chamber's height increases in a direct moving away from the bypass check valve 501.

When assembled, as seen in FIG. 9, the aspirator 600 also includes, a first seal member 136 seated in check valve 111 between the upper housing portion 104a' and the Venturi portion 106a' and a second check valve disc 510 seated in an improved bypass check valve 501 between the upper housing portion 104' and the bypass portion 106b'. The improved check valve 501 (made up of a portion of the upper housing portion 104a' and the lower bypass housing 106b') defines an internal cavity 504 having a first port 506 and a second port

508 both of which are in fluid communication with the internal cavity 504. The bypass check valve 501 has the features described above with respect to FIG. 7, including the second support structure 514 and a seal member 510, and operates as described above.

The noise attenuation unit 604, may be as described in co-pending, co-owned U.S. application Ser. No. 14/593,361, filed Jan. 9, 2015, which is incorporated herein by references in its entirety. The noise attenuating unit 604 includes a housing 605 defining an internal cavity 606 enclosing a noise attenuating member 616 therein. The noise attenuating member 616 typically fits securely, at least axially, within the internal cavity 606. As illustrated in FIG. 9, the noise attenuating member 616 has a generally close fit with the interior of the cavity 606, but such a construction is not required. The housing defines a first port 610 and a second port 612 in fluid communication with the internal cavity 606. The exterior surface of at least the first ports 610 includes fitting features 611 for connecting the noise attenuating unit 604 into a fluid flow path of the engine, for example, features insertable into a hose or conduit to provide a secure fluid-tight connection thereto. In this embodiment, the second port 612 includes a lid-like feature 620 connectable to the chamber 602 of the upper housing portion 104a'. The first port 610 and the second port 612 are illustrated in FIG. 9 as positioned opposite one another to define a generally linear flow path through the noise attenuation unit 10, but the unit is not limited thereto.

The housing 605 may be a multiple piece housing with a plurality of pieces connected together with a fluid-tight seal. The multiple pieces may include a first housing portion 608 that includes the first port 610 and a second housing portion 609 that includes the second port 612. The housing portions collectively define the cavity 606 and any combination of proportion of the cavity is defined by either portion. In FIG. 9, the second housing portion 609 is illustrated as defining the majority of the cavity 606, which makes the first housing portion 608 more like a lid.

The noise attenuating member 616 comprises noise attenuating material that is porous such that fluid flow through the unit 604 is restricted the least amount possible, but sound (turbulence generated noise) is attenuated. Examples of materials and multiple embodiments for the noise attenuating member 616 are described above. In the embodiment illustrated in FIG. 9, the noise attenuating material is disposed about a core 614, which may be described as a skeletal core because it is hollow, defining an inner cavity 622, and has a plurality of openings 624 therethrough that allow fluid flow radially outward from the inner cavity 622 into the noise attenuating member 616. The inner cavity 622 is typically aligned with the direction of predominant fluid flow through the noise attenuating unit 604. The sound attenuating member 616 is a porous material such as one of those described above.

Having described the invention in detail and by reference to specific embodiments thereof, it will be apparent that numerous modifications and variations are possible without departing from the spirit of the invention as defined by the following claims.

What is claimed is:

1. A Venturi device comprising:
  a housing defining a passageway having a central longitudinal axis, wherein the passageway comprises a first tapering portion coupled to a second tapering portion at a fluid junction in fluid communication with a suction port, defining a bypass port in fluid communication with the passageway located downstream of the second tapering portion, and defining a bypass check valve controlling fluid flow through the bypass port;
  wherein the bypass check valve comprises:
    an internal cavity having a first seat defining a closed position and a second seat comprising a plurality of fingers defining an open position that are circumferentially spaced apart about the bypass port and project into the internal chamber;
    a check valve disc within the internal cavity that translates between a flat sealing state in the closed position, and an angled state or a deflected state against the plurality of fingers in the open position;
    wherein the plurality of fingers has a shortest finger in a position that defines a longer distance of travel to the closed position for a first portion of the check valve disc in need thereof and has longer fingers in a position that define a shorter distance of travel to the closed position for a second portion of the check valve disc in need thereof, thereby in operation the first portion and the second portion of the check valve disc are seated against the first seat closer in time to one another in response to a pressure differential.

2. The Venturi device of claim 1, further comprising a second check valve controlling fluid flow through the suction port.

3. The Venturi device of claim 1, wherein the second seat has a middle axis transverse to a plane of a longitudinal cross-section of the housing and has the shortest finger positioned to either the left or to the right of the middle axis, wherein the plurality of fingers comprise a second finger positioned opposite the shortest finger, wherein the second finger has a height greater than the shortest finger.

4. The Venturi device of claim wherein 3, wherein the longer fingers comprise opposing third fingers between the second finger and the shortest finger, wherein the third fingers each have a height greater than the second finger.

5. The Venturi device of claim 4, wherein the second finger has a height that is 70% to 90% of the height of the third fingers.

6. The Venturi device of claim 4, wherein the third fingers are aligned with the middle axis.

7. The Venturi device of claim 1, wherein the housing includes a pin extending into the internal cavity, the check valve disc includes a bore therethrough, and the pin of the housing is received in the bore of the check valve disc for translation of the seal member along the pin.

8. The Venturi device of claim 1, further comprising a first sound attenuating member disposed in the fluid path of the passage between the suction port and the bypass port.

9. The Venturi device of claim 8, wherein the first sound attenuating member is housed in a dual chambered canister that forms a first chamber housing the sound attenuation member and a second chamber surrounding at least a portion of the second tapering portion, the second chamber being upstream of the first chamber.

10. The Venturi device of claim 8, further comprising a second sound attenuating member connected upstream of an inlet port into the bypass check valve.

11. The Venturi device of claim 1, wherein the passageway further comprises an auxiliary port downstream of the second tapering portion and in fluid communication with the bypass port.

12. A check valve unit comprising:
  a housing defining an inlet port, an outlet port, and an internal chamber in fluid communication with the inlet port and the outlet port thereby defining a flow path from the inlet port through the internal chamber to the outlet port, wherein the internal cavity has a first seat defining a closed position and a second seat defining an open position, the second seat comprising a plurality of fingers circumferentially spaced apart about the outlet port and projecting into the internal chamber;

wherein the second seat has a middle axis transverse to a plane of a longitudinal cross-section of the housing and has a shortest finger positioned to either the left or to the right of the middle axis; and a check valve disc within the internal cavity that translates between a flat sealing state in the closed position, and an angled state, relative to the middle axis, or a deflected state against the plurality of fingers in the open position, thereby defining a longer distance of travel to reach the closed position for a portion of the check valve disc that is associated with the position of the shortest finger relative to other portions of the check valve disc.

13. The Venturi device of claim 12, wherein the plurality of fingers comprise a second finger positioned opposite of the middle axis from the shortest finger, wherein the second finger has a height greater than the shortest finger.

14. The Venturi device of claim wherein 13, wherein the plurality of fingers comprise opposing third fingers circumferentially positioned between the second finger and the shortest finger, wherein the third fingers each have a height greater than the second finger.

15. The Venturi device of claim 14, wherein the second finger has a height that is 70% to 90% of the height of the third fingers.

16. The Venturi device of claim 12, wherein the housing includes a pin extending into the internal cavity, the check valve disc includes a bore therethrough, and the pin of the housing is received in the bore of the check valve disc for translation of the seal member along the pin.

17. A housing unit of a Venturi device comprising:
a body defining a passageway having a central longitudinal axis and defining a port in fluid communication with the passageway;

wherein the passageway has a first end defining a discharge exit and a second end defining a first canister portion in which a sound attenuating member is seatable; and wherein the exterior of the body comprises a plurality of fingers circumferentially spaced apart about the port that project away from the passageway;

wherein the plurality of fingers has opposing middle fingers of greatest height positioned at a middle axis transverse to a plane of a longitudinal cross-section of the body and has a shortest finger positioned to either the left or to the right of the middle axis.

18. The Venturi device of claim 17, wherein the second end is mateable to a second canister portion defined by a second housing unit.

19. The Venturi device of claim 18, wherein the second end of the passageway has a length configured to extend beyond the second canister portion to define a dual chambered canister housing a sound attenuation member in a first chamber most proximate the port and a second chamber upstream of the first chamber.

20. The Venturi device of claim 17, further comprising a first sound attenuating member seated in the first canister portion.

21. The Venturi device of claim 18, wherein the plurality of fingers comprise a second finger positioned upstream of the middle axis, wherein the second finger has a height greater than the shortest finger.

22. The Venturi device of claim wherein 18, wherein the plurality of fingers comprise opposing third fingers circumferentially positioned between the second finger and the shortest finger, wherein the third fingers each have a height greater than the second finger.

23. The Venturi device of claim 22, wherein the second finger has a height that is 70% to 90% of the height of the third fingers.

* * * * *